Dec. 30, 1941.    J. B. SIKORA    2,268,171
BRAKE SHOE ADJUSTING GAUGE
Filed Dec. 5, 1940    2 Sheets-Sheet 1

Inventor
Joseph B. Sikora

By *Clarence A. O'Brien*

Attorney

Dec. 30, 1941.    J. B. SIKORA    2,268,171
BRAKE SHOE ADJUSTING GAUGE
Filed Dec. 5, 1940    2 Sheets-Sheet 2

Inventor
Joseph B. Sikora

By Clarence A. O'Brien

Attorney

Patented Dec. 30, 1941

2,268,171

UNITED STATES PATENT OFFICE 2,268,171

BRAKE SHOE ADJUSTING GAUGE

Joseph B. Sikora, Taylorville, Ill.

Application December 5, 1940, Serial No. 368,741

3 Claims. (Cl. 33—180)

The present invention relates to new and useful improvements in gauges for the brake shoes of automobiles equipped with the internal expanding type of brake and has for its primary object to provide a gauge for use in determining the proper adjustment of the brake shoe when the brake shoe has been relined.

An important object of the present invention is to provide a brake shoe gauge of this character provided with gauge elements for use upon brakes of different diameters and also providing means for centering the device on axles of various diameters.

A still further object is to provide a device of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts and in which—

Figure 1:
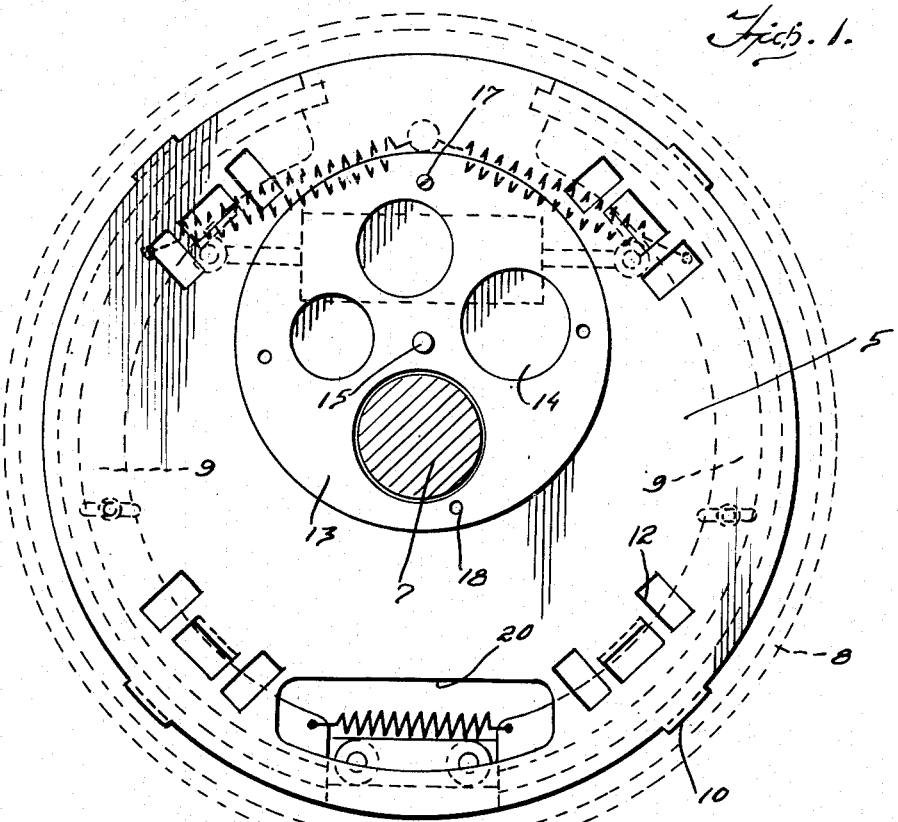
Figure 2:
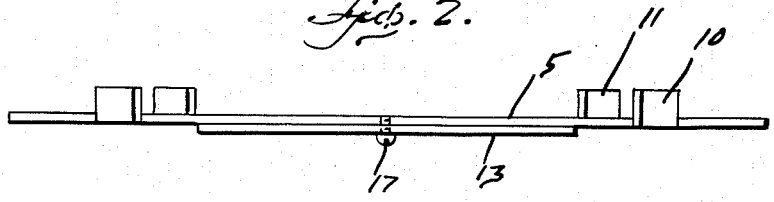
Figure 5:
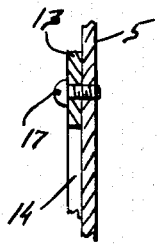
Figure 3:
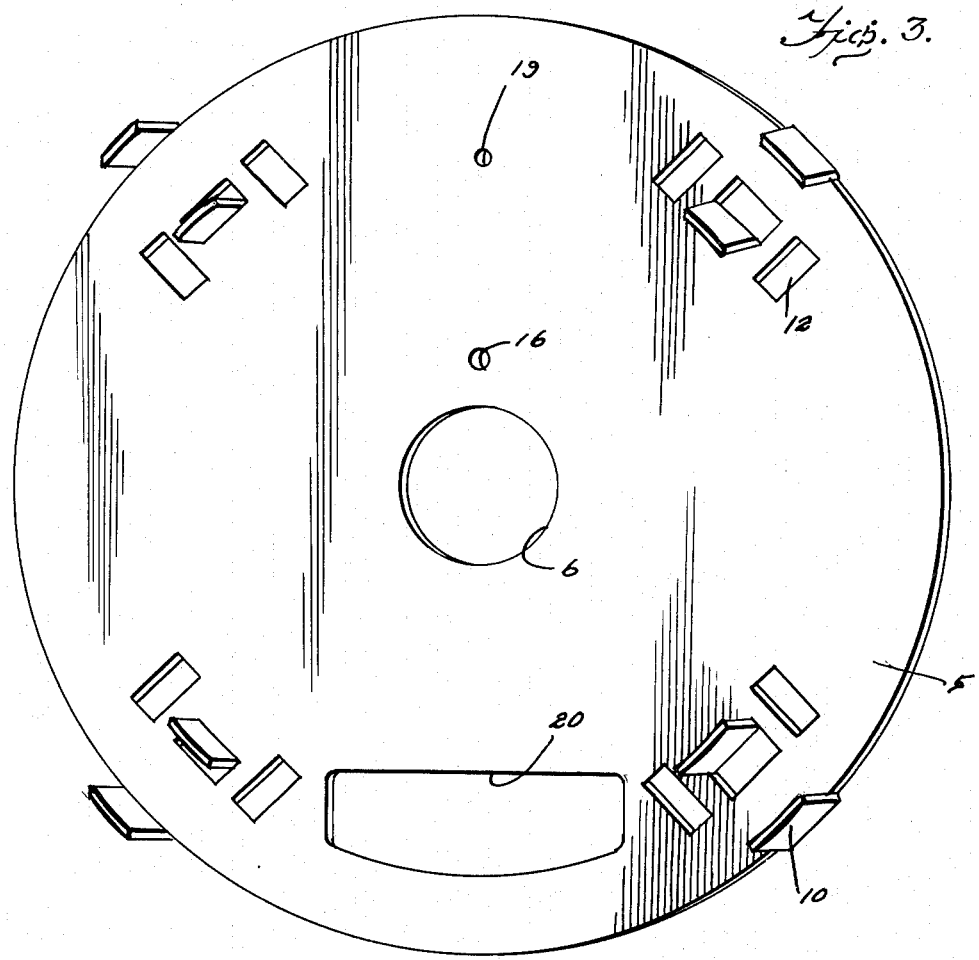
Figure 4:
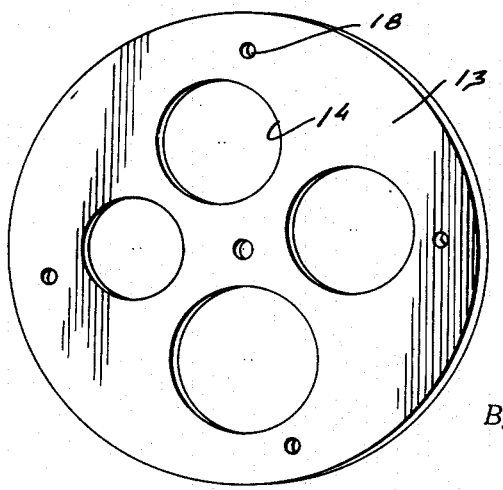

Figure 1 is a side elevational view showing the device in operative position with respect to the brake drum and brake shoes of an automobile and with the axle of the machine shown in section, Figure 2 is an edge elevational view of the gauge, Figure 3 is a side elevational view of the gauge disk with the outwardly projecting feelers shown thereon, Figure 4 is a perspective view of the adjustable mounting for the axle, and Figure 5 is a fragmentary sectional view illustrating the anchoring screw provided for securing the axle supporting disk in position on the gauge disk.

Referring now to the drawings in detail, the numeral 5 designates a gauge disk preferably constructed of sheet metal and having a central opening 6 for receiving the axle 7 of the automobile. The brake drum of the automobile is shown at 8 and the pair of pivoted brake shoes of conventional construction are shown at 9—9.

Spaced equidistantly around the periphery of the disk 5 are a plurality of feelers 10, the feelers projecting radially and are of slightly arcuate form to conform to the curvature of the brake shoes and are secured at one edge to the periphery of the disk 5, so that when the disk is mounted on the axle 7 the feelers 10 will be positioned against the outer surface of the lining of the brake shoes 9.

One of the feelers 10 is provided for positioning on the brake shoe adjacent the heel portion of each brake shoe and another feeler is adapted for positioning on each brake shoe adjacent the toe portion of the brake shoe. The feelers 10 which are designed for positioning adjacent the heel portion of the brake shoe are preferably of six thousandths thickness, while the feelers positioned adjacent the toe portion of the brake shoes are preferably of twelve thousandths thickness to provide for the proper clearance between the brake shoes and the brake drums at the heel and toe portions thereof when the proper adjustment has been made.

Where it is desired to use the gauge upon brakes of smaller diameter, I provide a plurality of outwardly struck feelers 11 on one surface of the disk 5, the feelers 11 being preferably spaced radially inwardly from the feelers 10 and are likewise of slightly arcuate form to conform to the curvature of the brake shoe and are also of the desired thickness as indicated above. Adjacent each of the feelers 11 and positioned at each edge thereof are a pair of window openings 12 which constitute sight openings to enable the mechanic to properly position the feelers 11 on the brake shoes.

In order that the disk 5 may be centered on axles of various diameters, I provide an axle mounting disk 13 having a plurality of openings 14 formed therein, said openings being of various diameters corresponding to the diameters of the various standard types of axles.

The disk 13 is provided with a central pin 15 pivotally mounting the disk in an opening 16 formed in the disk 5 adjacent its central opening 6 and the openings 14 are arranged with their centers equidistantly from the center of the pin 15 as well as from the center of the opening 6 of the disk 5.

In order to secure the disk 13 in its adjusted position, I provide a set screw 17 adapted for insertion in openings 18 formed in the disk 13 which are adapted to align with an opening 19 formed in the disk 5, the center of the openings 6, 16 and 19 being on a common radial plane.

The disk 5 is also provided with an opening 20 providing access to the heel portion of the brake shoes 9 to permit adjustment thereof.

It is believed the details of construction, advantages and manner of use of the device will be readily understood from the foregoing without further detailed explanation.

Having thus described the invention, what I claim is:

1. A gauge for vehicle brakes of the expansible shoe type, said gauge comprising a disk having a central opening adapted for mounting on the axle of a vehicle wheel and a plurality of fingers projecting from one face of the disk and adapted for positioning outwardly of the brake shoe to limit adjustment of the shoe, and a second disk rotatably secured to one face of the first disk eccentrically thereof and having a plurality of axle receiving openings of various diameters adapted for selectively registering with the central opening of the first disk to center the first disk on the axle.

2. A gauge for vehicle brakes of the expansible shoe type, said gauge comprising a disk having a central opening adapted for mounting on the axle of a vehicle wheel and a plurality of fingers projecting from one face of the disk and adapted for positioning outwardly of the brake shoe to limit adjustment of the shoe, and means carried by the disk for centering the disk on the axle when said axle is of a diameter less than the diameter of said central opening.

3. A gauge for vehicle brakes of the expansible shoe type, said gauge comprising a disk having a central opening adapted for mounting on the axle of a vehicle wheel, a plurality of radially spaced feeler gauge members carried by the disk and adapted for positioning outwardly of the brake shoe to limit adjustment of the shoe, and means carried by the disk for centering the disk on the axle when said axle is of a diameter less than the diameter of said opening.

JOSEPH B. SIKORA.